Dec. 19, 1939.　　　W. D. NORGARD　　　2,184,266
APPARATUS FOR COATING TUBES WITH LUMINESCENT MATERIALS
Filed March 28, 1939　　　3 Sheets-Sheet 1
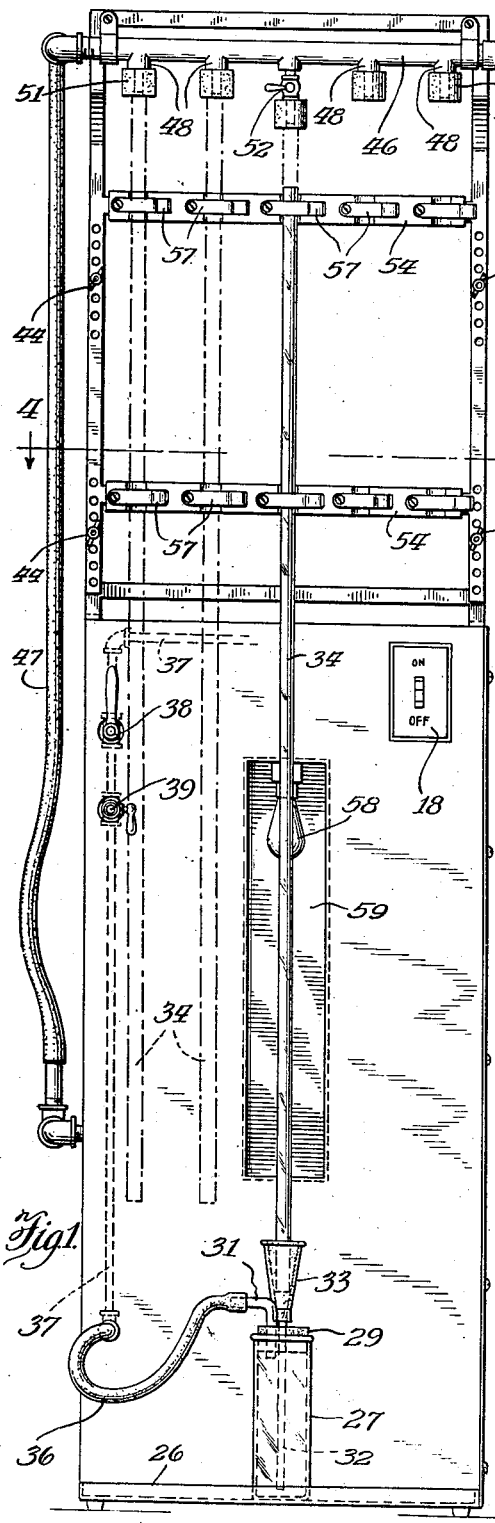
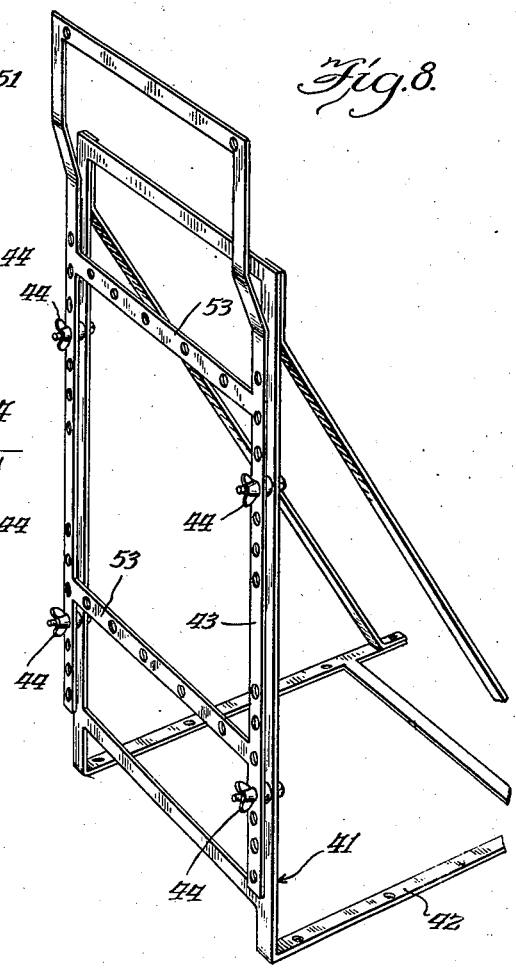
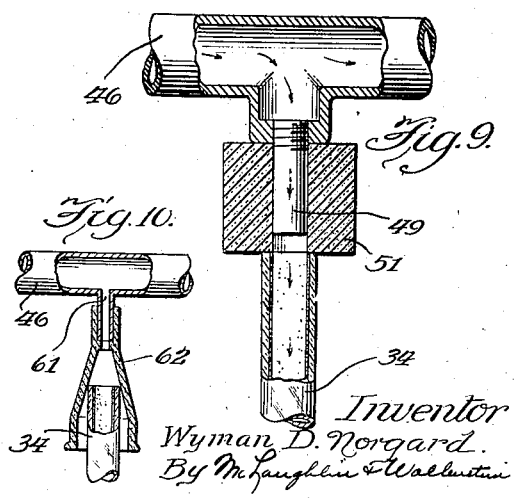
Inventor
Wyman D. Norgard.
By McLaughlin & Wallenstein
Attys.

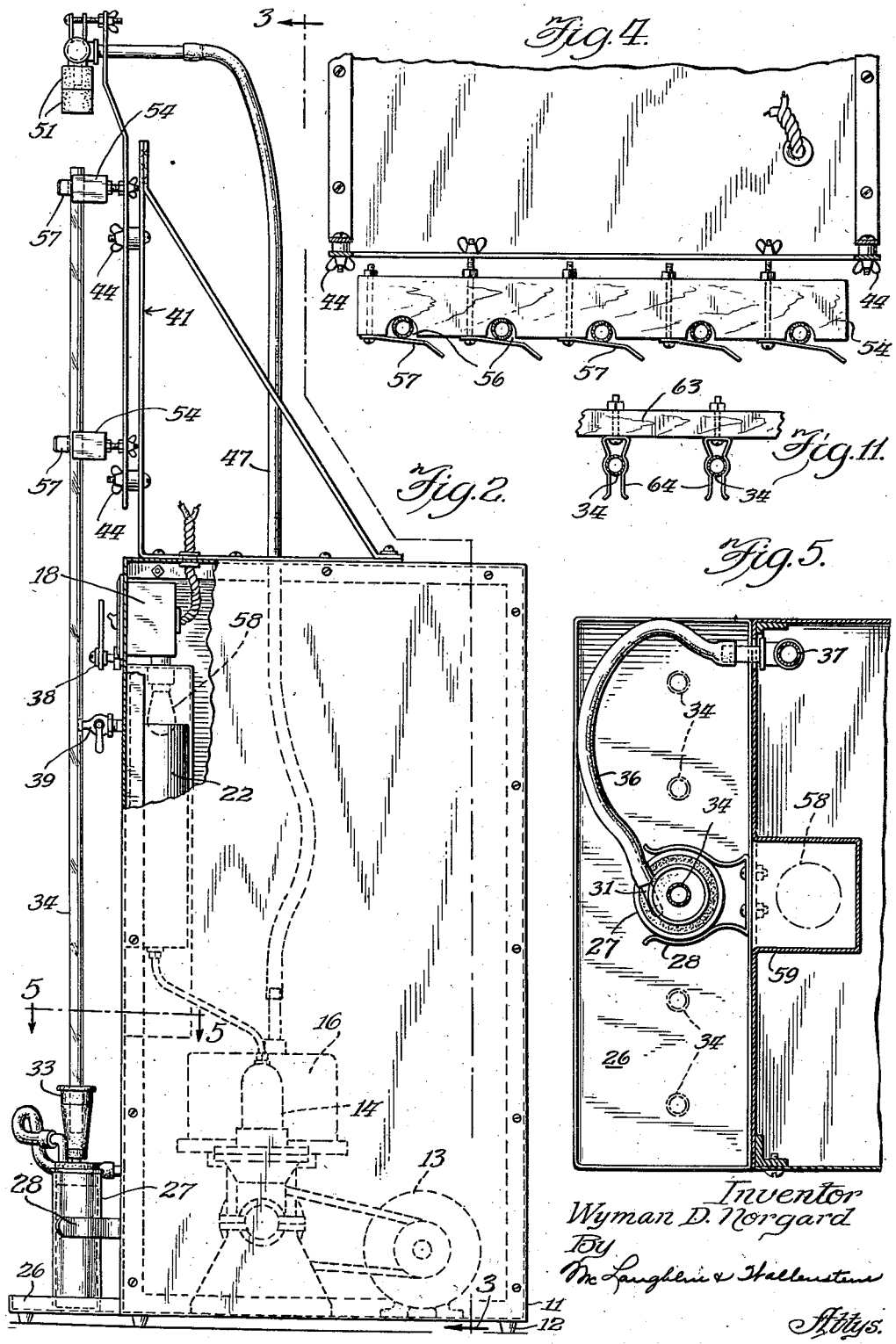

Dec. 19, 1939.    W. D. NORGARD    2,184,266
APPARATUS FOR COATING TUBES WITH LUMINESCENT MATERIALS
Filed March 28, 1939    3 Sheets-Sheet 3
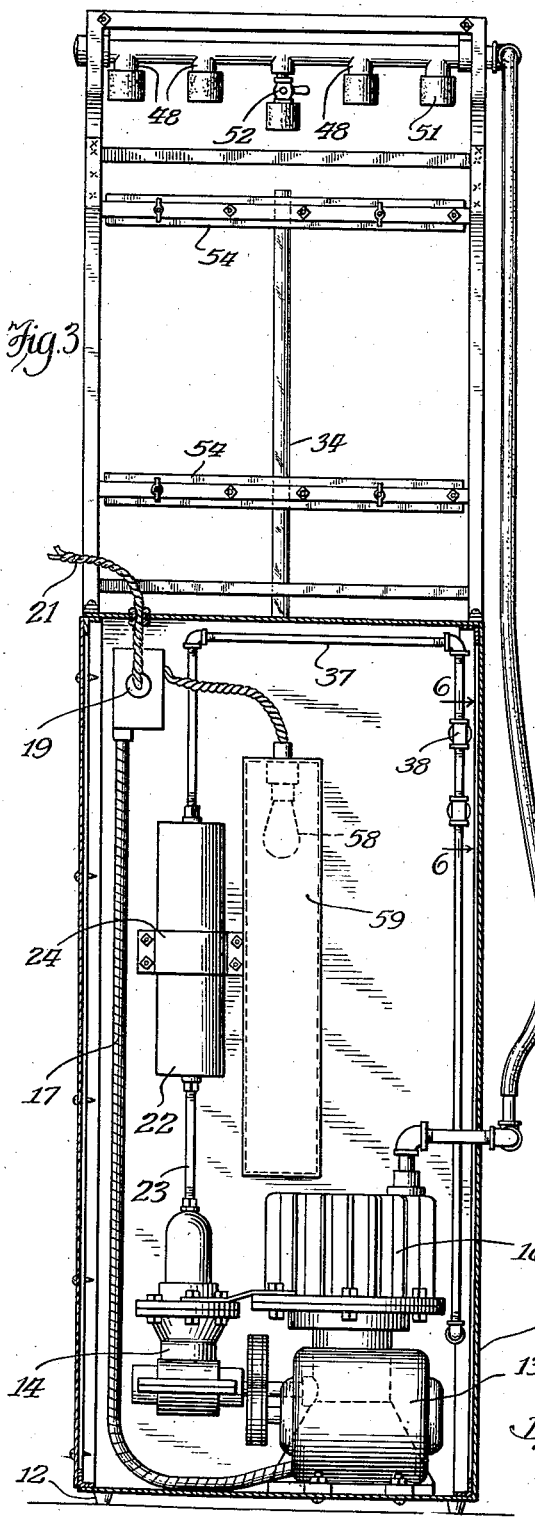
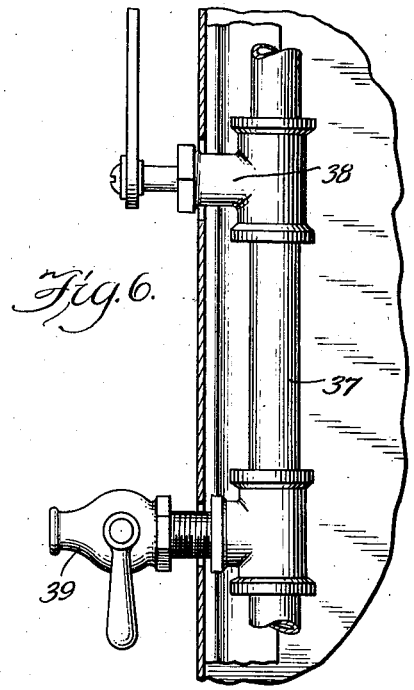
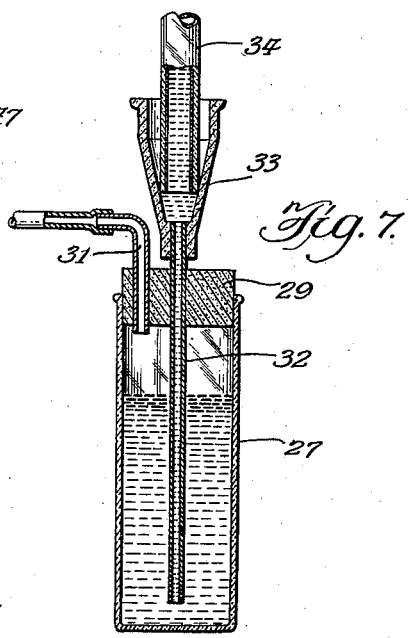
Inventor
Wyman D. Norgard
By McLaughlin & Wallenstein
Attys.

UNITED STATES PATENT OFFICE 2,184,266

APPARATUS FOR COATING TUBES WITH LUMINESCENT MATERIALS

Wyman D. Norgard, Davenport, Iowa, assignor to General Luminescent Corporation, Chicago, Ill., a corporation of Illinois Application March 28, 1939, Serial No. 264,670

5 Claims. (Cl. 91—55)

My invention relates in general to the art of coating tubes with luminescent materials. It relates more specifically to improved mechanism for coating tubes with luminescent material.

It has been known for a long period of time that certain types of materials exhibit luminescence or fluorescence when subjected to light rays, particularly light rays of relatively short wave length. In recent years, this phenomenon has been taken advantage of in the sign and lighting industry. Coatings of luminescent materials have been applied on the inside of glass tubes and the glass tubes subsequently fitted with electrodes, evacuated and then filled with, for example, mercury and argon at relatively low pressures. When the electrodes are suitably connected to a source of current, there is an electrical discharge through the argon and mercury accompanied by the evolution of light, much of it at relatively short wave lengths, with the result that the luminescent coating gives off a light of longer wave length, for example, in the green, red or blue portions of the spectrum. In general, the luminescent material must be coated on the inside of the tube, rather than on the outside thereof, to prevent accidental removal of the luminescent material and also to take advantage of the short rays which normally will not pass through ordinary glass.

The application of luminescent materials to the inside of tubes and the like has presented some problems, particularly in obtaining a uniform, even coating. Conventionally most applications of luminescent materials are made by hand, sometimes utilizing some equipment, but the means employed have not resulted in uniformly desirable results. A common method is to treat the inside of the glass with some material which will cause the luminescent material to adhere thereto and then dusting the luminescent material onto the applied coating in the form of a fine powder. Other suggestions have been made and in part used based on more or less the same procedure. In addition to the difficulties as to uniformity, securing proper adhesion, depth and other characteristics of the coating, and the like, the means employed have required more than the usual expenditure of time normally to be expected from a consideration of the operation involved.

One object of my invention is the provision of improved means for coating tubes with luminescent materials.

Further objects are the provision of coating apparatus which eliminates as a factor affecting the uniformity of the results any lack of skill of the operator and which, by pneumatic control of the coating material in a minimum number of containers, reduces waste of luminescent material and prevents wear of the apparatus by having no moving parts in contact with the material.

In accordance with the mode of operation of the present invention, a body of vehicle-carried luminescent material is communicably connected with glass tubing to be internally coated, the tubing preferably extending upwardly from the body. The vehicle may be any suitable liquid, such as an organic solvent of high vapor pressure, and may contain materials to increase the adherence of the luminous material to the glass. Differential air pressure is applied to the liquid in the tube and to the body of liquid, the differential air pressure being such that the liquid moves to fill the tube. After the tube is filled to the desired point, the differential pressure is progressively constantly minimized to effect even rate of flow of liquid from the tube to the body. Such produces an even coating of vehicle and material on the inside of the tube. The vehicle may be evaporated by running a current of air through the tube. If a thicker coating is desired and it is desired to produce even more uniform results, the tube may be reversed end-for-end and the procedural coating steps repeated.

In the apparatus involved in my present invention, the mixture or suspension of the luminescent or fluorescent material is retained in a reservoir or container which is readily operably brought into association with the equipment employed. I provide means for supporting the tube while bringing the inside thereof into communication with a filling tube, one end of which projects below the level of the liquid mixture, and by applying air pressure to the top of the liquid in the reservoir or container, the liquid is forced to substantially the top of the tube. Means are provided for releasing the air pressure to allow the liquid which fills the tube to run back into the reservoir or container, leaving a relatively thin coating on the inside surface thereof. I provide in addition means for moving a column of air through the tube so treated in order to dry the same and leave the luminescent material dispersed in substantially dry form on the inside surface of the tube. Other features are provided, including means for simultaneously drying a plurality of tubes while one tube is being coated, means facilitating inspection of the coated tube, and means for adjusting the equipment to various sizes and lengths of tubes, and the like.

I show the invention embodied in a preferred form of device which combines inexpensiveness of construction with maximum convenience for production use in an establishment where coating is carried out.

In the drawings,

Fig. 1 is a front elevational view of the preferred embodiment of the equipment showing the reservoir in place and a tube in position for coating, some parts being shown in dotted lines to facilitate an understanding of the manner in which the equipment is used;

Fig. 2 is a side elevational view, with some parts broken away and some parts shown in dotted lines;

Fig. 3 is an irregular transverse sectional view, partly in elevation, taken on the line 3—3 of Fig. 2, looking in the direction of the arrows;

Fig. 4 is a fragmentary plan section taken on the line 4—4 of Fig. 1, looking in the direction of the arrows;

Fig. 5 is a similar plan sectional view taken on the line 5—5 of Fig. 2;

Fig. 6 is an enlarged sectional view, partly in elevation, showing the valve arrangement for controlling the delivery of air under pressure to the reservoir or container in which the coating liquid is placed.

Fig. 7 is a sectional view taken through the reservoir or container showing connections thereto, the view being on a slightly larger scale than the remaining figures to facilitate the showing thereof;

Fig. 8 is a perspective view showing a portion of a frame which forms the support for the tubes;

Fig. 9 shows one form of connection employed for bringing the tubes into association, with means for supplying the drying air;

Fig. 10 shows a modified form of the same feature as Fig. 9; and

Fig. 11 shows a modified form of supporting means for the tubes.

Referring now to the drawings, the apparatus there shown comprises a combination housing and frame structure 11 provided with suitable supports 12 so that it may be set directly on the floor of an establishment in which the equipment is employed. Within the combination housing and frame structure 11, I support a motor 13 driving a relatively small compressor 14 and a relatively larger compressor 16. Suitable drive connections are provided, as shown, the motor receiving electric power through a conventional type of cable 17 controlled by a conventional type of switch 18 placed on the front of the combination housing and support which, for convenience, will be referred to as the cabinet. One side of the switch 18 is provided with a socket for receiving a plug 19 connected with an extension cord 21 adapted to be attached to a suitable source of power. This is in general a conventional arrangement and obviously may be modified to suit particular conditions.

The relatively small compressor, indicated generally by the reference character 14, has its pressure side connected to an air storage tank 22 through a pipe 23, the tank 22 being suitably secured, such as by a strap 24, to the inside rear wall of the cabinet. The air under pressure in the tank 22 is utilized for the tube filling operation, while the air delivered from the compressor 16, which is of greater capacity, is employed for drying. Extending a short distance in front of the cabinet is a trough or tray 26 on which a reservoir 27 is adapted to be placed. Support and positioning means 28 are provided to hold the container or reservoir 27 in fixed position while it is associated with the remaining portion of the apparatus. Conveniently, the support and positioning means may take the form of a spring clip, as shown.

The reservoir or container 27 may be a glass receptacle or a receptacle made out of any suitable material into which the user of the equipment may place the liquid coating mixture. Conveniently, however, it may be a container in which the liquid coating mixture is vended to the user of the coating equipment. Its form and dimensions may be modified, so long as the structural features required for associating it substantially rigidly with the remaining equipment and functioning in the intended manner are maintained. Preferably, the reservoir 27 has a relatively wide mouth for receiving a stopper 29 (see Fig. 7). The stopper 29 has a tube 31 extending through it and terminating above the level of liquid to permit the introduction of air under pressure, and a filling tube 32 extending substantially to the bottom of the reservoir or container and having its top end associated with a funnel-shaped member 33 into which a tube 34 is adapted to be placed. The funnel-like member 33 is preferably formed of semi-elastic rubber so that when the end of the tube 34 is placed in the position shown in Fig. 7, an effective seal will be formed and the inside of the tube 34 is placed in communication with the inside of the filling tube 32.

The pressure tube 31 has its outer end connected to a flexible tube 36 which is flexible rubber tubing, and the opposite end of the flexible tube 36 is frictionally held over a nipple at the end of a pipe 37. For convenience, the reference character 37 has been applied to the entire pipe connection including fittings leading to the air storage tank 22 so that it will be seen that air under pressure from the air storage tank 22 may be delivered through the flexible tube 36 and tube 31 to the upper part of the liquid reservoir 27. In the pipe line 37, however, I place a shut-off valve 38 and a bleeder or release valve 39, the former controlling the delivery of air under pressure to the container 27 and the latter utilizable to release the pressure after the tube 34 has been filled with the liquid. I may, if desired, employ a single compound valve, but, as will be shown in a description of the operation, the use of the two valves is convenient for my purpose.

Secured to the top of the cabinet 11 is a tube supporting frame, indicated generally by the reference character 41. This comprises a main supporting frame 42, which is secured to the upper part of the cabinet, and a vertically adjustable frame 43. The adjustment is made by removing the thumb nuts 44 (see Fig. 8), positioning the frame 43, as desired, making use of the series of holes in the vertical members thereof, and then replacing the thumb nuts. The arrangement is such that the bolts and spacers shown in the figure do not have to be removed.

The frame 41 carries at its top a transverse pipe 46 which receives air under pressure from the compressor or blower 16 through a series of connections, as shown in Fig. 3, including a flexible hose 47. At spaced intervals along the pipe 46 are short pipes 48, which communicate with the inside of the pipe 46, and these pipes are provided with nipples 49 (Fig. 9) over which rubber stopper-like members 51 are frictionally held. By bringing the tube 34 up against the lower edge of the rubber member 51, an adequate connection is provided for delivering air from the pipe 46 through the inside of the tube for drying the same after it has been treated with the coating material. The middle one of the nipples 49, in line with the position which the tube occupies during the initial coating operation, is preferably provided with a small valve 52 to permit shutting off of the air.

The frame 43 has a pair of cross members 53 to which strip members 54, formed of wood or similar material, are secured. In line with each tube position, the strip members have cut-away portions 56, these cut-away portions being of generally semi-circular cross section and having their radius of curvature about the same as the maximum size tube which it is expected the equipment would have to accommodate. Adjacent each cut-away portion is a spring clip 57, shaped in the general manner shown in Fig. 4, whereby to permit easy insertion of the tubes from the side and easy removal thereof while at the same time holding the tubes firmly during actual operations.

Substantially centrally of the front of the cabinet, I place a lamp 58 utilizing a recessed portion 59 formed to reflect light from the lamp through the tube along at least that portion of the tube which lies over the recess.

In Fig. 10, I show a modified means for bringing the tubes into communication with the drying air from pipe 46. In this form, a nipple 61 is inset directly into the pipe 46, and a generally funnel-shaped rubber extension 62 is utilized, in general similar to that shown in Fig. 7. In this form, as well as in the previously described form, any suitable means known to those skilled in the art is employed for equalizing the air delivered at the various stations, such, for example, as the use of baffles, varying the size of the openings in the nipples, or the like.

In Fig. 11, I show a modified tube supporting means wherein a supporting strip 63 is utilized and, at spaced locations thereon, spring clips 64 are secured. This style of spring clip permits the direct insertion of the tube, and, on account of the construction of the clip, different size tubes are easily accommodated.

As already described, the luminescent or fluorescent material employed for the coating of the tubes is suspended in a suitable medium. A desirable fluid is one prepared in the following manner: The luminescent material is ground to relatively fine size, for example 200 or 300 mesh, and is dispersed in a mixture of methyl alcohol and acetone, together with a proportion of borax to promote the binding of the luminescent material to the inside surface of the glass tube, and, if desired, a material to assist in retaining the luminescent material in suspension in the alcohol and acetone mixture. I wish to point out, however, that, if the reservoir or container 27 is agitated before starting operations, the suspension will be maintained as long as operations are continued because of the agitation which results from forcing the liquid up into the tube and then allowing all of that liquid, except such as sticks to the inside surface of the tube, to run back into the reservoir.

In the drawings, I show the use of separate air pumps or compressors for the filling operation. While it is possible to employ only a single compressor, I find that somewhat better results are obtained by utilizing only a single small compressor for maintaining the necessary pressure in the tank 22, while the compressor 16 may be of larger size and deliver its output through the pipe system to the outlet nipples without the necessity of employing a storage tank.

A preferred manner of utilizing my invention is as follows: The reservoir or container 27, which may, for example, be a container in which a suitable coating material is vended, is placed in position so as to be supported by the positioning means 28. The stopper 29, with the associated apparatus, is then placed in position, the hose 36 being connected and valve 38 closed. The tubing, which should be thoroughly cleaned, is then placed one length at a time with its lower end in contact with the funnel-like rubber connection 33, the center pair of clips 57 being used to support it. The valve 38 is then opened slowly to permit the coating liquid to be driven up to the top of the tube 34. The valve 38 is then closed and the valve 39 opened, after the liquid has been allowed to stand a sufficient length of time in the tube. In general, this time need only be long enough to bring the liquid up momentarily. By means of the release valve 39, the speed at which the liquid returns to the reservoir can be controlled. The time allowed should be such as to cause a smooth coating to be left on the inside of the tube. The tube is then raised to the center drying nipple and the valve 52 opened. This allows any excess of liquid in the tube 34 to drain back into the reservoir, and, to assure that this will take place, the funnel-like rubber connection 33 is outflared a sufficient distance to catch all of the droppings from the tube. When the excess liquid has dropped from the tube, the tube is transferred to another drying station and a new tube 34 inserted for coating. By using four drying stations in the manner shown, I have found that adequate drying takes place if the tubes are processed in order, the tube longest in the rack being removed each time a newly coated tube is transferred to the drying station. The number of drying stations, however, and their relative position may be modified without departing from the principles of the invention.

In the event a tube has been preliminarily coated and an inspection shows the coating has not taken evenly, as will be shown by inspecting the tube by means of the light 58 and the reflecting recess 59, the tube may be again treated to apply the coating liquid thereto. Indeed, at times it may be desirable to coat tubes more than once, depending upon the results required, and to this end the tubes may be turned end-to-end, that is, first coating from one end and then from the other. Sometimes a more even application of the coating material is obtained in this way. After the tubes are coated and dried, they may be treated in the usual manner known in the art, for example, by baking, to cause a more durable adherence to the glass wall of the tube. The borax or other material which may be used for bonding functions during the heating step to promote adherence.

I have described a preferred embodiment of my invention, including modifications of certain parts, in detail, in order that those skilled in the art may understand how to practice the same, but my invention is limited only by the scope of the appended claims.

What I claim as new and desire to protect by Letters Patent of the United States is:

1. In a unitary apparatus of the class described, a frame, a reservoir adapted to contain a supply of coating material in liquid form, means for releasably supporting a tube in vertical position on said frame with its inside surface in communication with the liquid in said reservoir, means for applying air pressure to the top of the liquid in the reservoir to cause the same to rise in said tube while said tube is supported on said frame, means for releasing said pressure whereby to permit said liquid to flow by gravity back into said reservoir, and means for passing air through said tube after the coating liquid has been applied thereto and while supporting the tube upon said frame.

2. In apparatus of the class described, a cabinet, a frame positioned above the cabinet, means associated with the frame for supporting a plurality of tubes in vertical position, a reservoir for liquid coating material associated with the cabinet, means for associating at least one of said tubes with said reservoir, means including air pressure for forcing liquid coating material from said reservoir into said tube, and means for delivering air through the coated tubes supported by said frame.

3. A unitary apparatus for coating open-ended glass tubes with a luminescent material comprising a frame adapted to support at least one tube in vertical position, a reservoir adapted to contain a supply of coating material in liquid form, means for releasably supporting a tube in vertical position on said frame with its inside surface in communication with the liquid in said reservoir, means for creating a differential gas pressure to cause said coating liquid to rise in said tube while said tube is supported on said frame, means for releasing said pressure whereby to permit said liquid to flow out of said tube back into said reservoir, and means for passing a gas through said tube after the coating liquid has been withdrawn therefrom and while supporting the tube upon said frame.

4. A unitary apparatus for coating open-ended glass tubes with a luminescent material comprising a frame, means associated with the frame for supporting a plurality of tubes in vertical position, a reservoir for liquid coating material, means for associating at least one of said tubes with said reservoir while said tube is supported on said frame, means for producing a pressure differential for forcing liquid coating material from said reservoir into said tube, and means for delivering a gas through at least one of the coated tubes supported by said frame.

5. Apparatus for coating tubes with luminescent material, comprising a frame support, a reservoir associated with said frame support adapted to contain a supply of said luminescent material in the form of a suspension thereof in a liquid vehicle, a connection to the top of said reservoir, means for delivering gas under pressure through said connection to the top of said suspension of luminescent material in the liquid vehicle, a fitting at the top of said reservoir for readily and quickly attaching a tube thereto, a connection from said fitting to a point beneath the level of the suspension in the reservoir whereby to place the interior of the tube in communication with the inside of the reservoir, readily releasable means on said frame support for holding a tube and one end thereof in contact with said fitting and the opposite end open to the atmosphere, a pipe on the frame support near the top of the tube, means for delivering gas under pressure through said pipe, and means associated with said pipe for readily and quickly connecting the upper end of a tube therewith, whereby when a tube is associated with said reservoir the suspension of luminescent material in the liquid vehicle may be forced up into the tube and then allowed to flow back into the reservoir, leaving a thin coating of the suspension on the inside of the tube, and whereby the tube may be quickly connected to the pipe carrying gas under pressure, and gas passed therethrough to drive off the suspending liquid and leave a dry adherent coating of the luminescent material.

WYMAN D. NORGARD.